United States Patent
Yard et al.

(10) Patent No.: US 11,241,967 B2
(45) Date of Patent: Feb. 8, 2022

(54) MOTOR VEHICLES, POWERTRAIN SYSTEMS AND CONTROL LOGIC FOR THE DYNAMIC ALLOCATION OF FAST TORQUE PRODUCTION

(71) Applicant: GM Global Technology Operations LLC, Detroit, MI (US)

(72) Inventors: Matthew Yard, Milford, MI (US); Luke D. Shepley, Berkley, MI (US); Jacob B. Wilson, Howell, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 331 days.

(21) Appl. No.: 16/420,649

(22) Filed: May 23, 2019

(65) Prior Publication Data
US 2020/0369162 A1 Nov. 26, 2020

(51) Int. Cl.
*B60W 20/10* (2016.01)
*B60L 15/20* (2006.01)
*B60W 50/038* (2012.01)
*B60W 30/18* (2012.01)

(52) U.S. Cl.
CPC ......... *B60L 15/2009* (2013.01); *B60W 20/10* (2013.01); *B60W 50/038* (2013.01); *B60W 2030/18081* (2013.01); *B60W 2710/0666* (2013.01)

(58) Field of Classification Search
None
See application file for complete search history.

(56) References Cited

U.S. PATENT DOCUMENTS

| | | | |
|---|---|---|---|
| 6,752,131 B2 | 6/2004 | Poola et al. | |
| 6,994,072 B2 | 2/2006 | Kuo et al. | |
| 7,128,047 B2 | 10/2006 | Kuo et al. | |
| 7,367,313 B2 | 5/2008 | Chang et al. | |

(Continued)

FOREIGN PATENT DOCUMENTS

| | | | | |
|---|---|---|---|---|
| CN | 101545410 A | * | 9/2009 | ......... F02D 41/0002 |
| CN | 102556053 A | * | 7/2012 | .............. B60L 50/15 |

(Continued)

*Primary Examiner* — Katy M Ebner
(74) *Attorney, Agent, or Firm* — Quinn IP Law (57) ABSTRACT

Presented are vehicle powertrains and control logic for provisioning intelligent fast-torque output, methods for making/using such systems, and electric-drive vehicles with dynamically allocated fast-torque production. A method of controlling torque output of a vehicle powertrain includes a vehicle controller receiving sensor data and determining therefrom maximum and minimum motor torque capacities of a traction motor. The controller calculates the traction motor's maximum and minimum effective motor capacities based on a previous motor torque command and the maximum and minimum torque capacities, respectively. The controller then determines if a negative of the crankshaft torque reserve is: (1) greater than the minimum effective motor capacity; and (2) less than the maximum effective motor capacity. If (1) or (2) is true, an engine spark torque command is set equal to an air torque spark value, and the controller commands an engine assembly to modulate its torque output based on the spark torque command.

20 Claims, 3 Drawing Sheets

(56) References Cited

U.S. PATENT DOCUMENTS

| | | | |
|---|---|---|---|
| 7,463,970 B2 * | 12/2008 | Livshiz | F02D 11/105 701/114 |
| 7,689,343 B2 | 3/2010 | Dagci et al. | |
| 7,725,244 B2 | 5/2010 | Itoga et al. | |
| 8,000,882 B2 | 8/2011 | Ramappan et al. | |
| 8,210,158 B2 | 7/2012 | Kang et al. | |
| 8,316,818 B2 | 11/2012 | Ramappan et al. | |
| 8,347,860 B2 | 1/2013 | Kang et al. | |
| 8,696,514 B1 * | 4/2014 | Heap | B60K 6/445 477/3 |
| 8,776,737 B2 | 7/2014 | Bayer et al. | |
| 9,074,551 B2 | 7/2015 | Yun et al. | |
| 9,334,815 B2 | 5/2016 | Cygan, Jr. et al. | |
| 9,551,248 B2 | 1/2017 | Warey et al. | |
| 9,689,321 B2 | 6/2017 | Kang et al. | |
| 9,689,339 B2 | 6/2017 | Kang et al. | |
| 2002/0123836 A1 * | 9/2002 | Komiyama | B60K 6/48 701/51 |
| 2009/0241899 A1 * | 10/2009 | Whitney | F02D 41/0002 123/406.45 |
| 2009/0299602 A1 * | 12/2009 | Hartrey | F02D 41/1497 701/102 |
| 2010/0057330 A1 * | 3/2010 | Whitney | F02D 41/024 701/103 |
| 2010/0294232 A1 | 11/2010 | Otterstrom | |
| 2011/0247587 A1 | 10/2011 | Chen | |
| 2013/0080023 A1 | 3/2013 | Livshiz et al. | |
| 2013/0080026 A1 | 3/2013 | Kang et al. | |
| 2016/0069318 A1 * | 3/2016 | Doering | F02D 41/023 477/102 |
| 2016/0258410 A1 | 9/2016 | Cygan, Jr. et al. | |
| 2016/0362020 A1 | 12/2016 | Shepley et al. | |
| 2016/0363057 A1 * | 12/2016 | Cygan, Jr. | F02D 13/0207 |
| 2019/0143960 A1 * | 5/2019 | Johri | B60W 20/15 477/3 |
| 2020/0123965 A1 * | 4/2020 | Bastanipour | F02B 37/10 |
| 2020/0361441 A1 * | 11/2020 | Ruybal | B60W 10/06 |

FOREIGN PATENT DOCUMENTS

| | | | | |
|---|---|---|---|---|
| DE | 102014217148 A1 * | 3/2015 | | B60W 10/08 |
| DE | 102015100293 A1 * | 7/2015 | | B60K 6/48 |
| DE | 102021100233 A1 * | 7/2021 | | B60W 20/40 |

\* cited by examiner

MOTOR VEHICLES, POWERTRAIN SYSTEMS AND CONTROL LOGIC FOR THE DYNAMIC ALLOCATION OF FAST TORQUE PRODUCTION

INTRODUCTION

The present disclosure relates generally to motor vehicle powertrains. More specifically, aspects of this disclosure relate to electric-drive vehicles with automated engine combustion timing and motor-assist control strategies for fast-response torque output.

Current production motor vehicles, such as the modern-day automobile, are originally equipped with a powertrain that operates to propel the vehicle and power the vehicle's onboard electronics. In automotive applications, for example, the vehicle powertrain is generally typified by a prime mover that delivers driving power through an automatic or manually shifted power transmission to the vehicle's final drive system (e.g., differential, axle shafts, road wheels, etc.). Automobiles have historically been powered by a reciprocating-piston type internal combustion engine (ICE) assembly due to its ready availability and relatively inexpensive cost, light weight, and overall efficiency. Such engines include compression-ignited (CI) diesel engines, spark-ignited (SI) gasoline engines, and rotary engines, as some non-limiting examples. Hybrid electric and full electric vehicles, on the other hand, utilize alternative power sources to propel the vehicle, such as battery-powered or fuel-cell-powered traction motors, and therefore minimize or eliminate reliance on a fossil-fuel based engine for tractive power.

A common overhead valve internal combustion engine includes an engine block with cylinder bores each having a piston reciprocally movable therein. Coupled to a top surface of the engine block is a cylinder head that cooperates with the piston and cylinder bore to form a variable-volume combustion chamber. These reciprocating pistons are used to convert pressure—generated by igniting a fuel-and-air mixture inside the combustion chamber—into rotational forces to drive the engine's crankshaft. The cylinder head defines intake ports through which air, provided by an intake manifold, is selectively introduced into each combustion chamber. Also defined in the cylinder head are exhaust ports through which exhaust gases and byproducts of combustion are selectively evacuated from each combustion chamber to an exhaust manifold. The exhaust manifold, in turn, collects and combines the exhaust gases for recirculation into the intake manifold, delivery to a turbine-driven turbocharger, or evacuation from the vehicle via an exhaust system.

A traditional cylinder head houses the ICE's valve train, which may include inlet valves, exhaust valves, rocker arms, pushrods, and, in some instances, one or more camshafts. For overhead valve (OHV) designs, the cylinder head may also house the engine's spark plugs and fuel injectors. The valve train is part of the powertrain subsystem responsible for controlling the amount of fuel-entrained air entering, and combustion-related exhaust gases exiting, the engine's combustion chambers at any given point in time. Engine torque and power output is varied by modulating valve lift and timing, which is accomplished by driving the inlet and exhaust valves, either directly or indirectly, by cam lobes on a rotating camshaft. Different engine speeds typically require different valve timing and lift for optimum performance. Generally, low engine speeds require valves to open a relatively small amount over a shorter duration, while high engine speeds require valves to open a relatively larger amount over a longer duration for optimum performance.

Four-stroke combustion engines commonly operate—as the name suggests—in four distinct stages or "strokes" to drive the engine's crankshaft. At one such (first) stage of operation, identified as the "intake stroke," a metered mixture of fuel and air is introduced into each cylinder as the corresponding piston travels rectilinearly from top-to-bottom along the length of the cylinder bore. Engine intake valves are opened such that a vacuum pressure generated by the downward-travelling piston draws air into the combustion chamber. At the end of this cycle, a metered quantity of finely atomized fuel is introduced into the chamber via a fuel injector. During a subsequent (second) stage, labelled the "compression stroke," the intake and exhaust valves are closed as the piston travels from bottom-to-top and compresses the fuel-air mixture. Upon completion of the compression stroke, another (third) stage or "power stroke" commences and a spark plug ignites the compressed fuel and air, with the resultant explosive expansion of gases pushing the piston back to bottom dead center (BDC). During a successive stage—more commonly referred to as the "exhaust stroke"—the piston once again returns to top dead center (TDC) with the exhaust valves open; the travelling piston expels the spent air-fuel mixture from the combustion chamber. To complete the four strokes of a single working (Otto) cycle requires two revolutions of the crankshaft.

SUMMARY

Disclosed herein are vehicle powertrain systems with attendant control logic for provisioning rapid-response system torque output, methods for making and methods for operating such powertrain systems, and electric-drive vehicles with dynamic allocation of fast-torque production capabilities. By way of example, there are presented hybrid-electric vehicle (HEV) powertrains and HEV control algorithms that dynamically allocate fast-torque production between one or more electric machines ("E-machine") and torque generated by adjusting spark angle in an internal combustion engine. The electric machine(s) are opportunely charged/discharged during requests for rapid crankshaft torque increases/decreases. These fast torque requests may include estimated torque spikes during fueled speed control, stall prevention at torque demands above air torque reserves, and immediate torque decrease requests during power-on upshifts. Fast torque demands are achieved by dynamically changing the combination and contribution of E-machine generated torque and adjusted spark angle torque at each controller execution loop (e.g., every 10 to 15 milliseconds (ms)). The engine's air torque reserves may also be employed for fast crankshaft torque increase requests.

Torque output requests for a vehicle powertrain may be delineated into two general categories: fast torque requests and slow torque requests. A "fast torque request" may refer to a driver demand for near immediate or instantaneous torque output, whereas a "slow torque request" may refer to a comparatively delayed or reserved torque output. In the same vein, the term "fast torque actuator," as used herein, may be defined to include a powertrain device that is operable to rapidly increase and/or decrease current torque at a drive wheel axle. As a representative comparison for this dichotomy, engine air flow rate is generally designated as a "slow torque actuator" due to the slow response time between modulated system input and resultant system output. Antithetically, engine spark timing is one type of "fast torque actuator" due to the almost instantaneous response time between modulated system input and the resultant system output.

Attendant benefits for at least some of the disclosed concepts include vehicle powertrain systems with dynamic fast torque actuator allocation for rapid-response torque control offering improved work output and increased stall prevention. Other attendant benefits may include intelligent angle-based combustion timing complemented with opportunely charged/discharged motor assist to improve the functioning of the vehicle by controlling real-time torque output of the engine with minimal vehicle-to-vehicle calibration. Disclosed powertrain control systems offer the ability to optimize combustion efficiency while concomitantly providing rapid torque response tracking and minimizing fuel consumption with reduced emissions.

Aspects of this disclosure are directed to methods for making and methods for using any of the disclosed vehicles, vehicle powertrains, and/or powertrain control modules. In an example, a method is presented for controlling torque output of a motor vehicle powertrain. This vehicle powertrain includes an engine assembly and a traction motor that, independently or jointly, drive one or more of the vehicle's road wheels to thereby propel the vehicle. A resident or remote vehicle controller, which may be embodied as a distributed network of controllers or control modules, regulates operation of the traction motor and engine assembly. This representative method includes, in any order and in any combination with any of the above and below disclosed options and features: determining, via the vehicle controller based on one or more sensor signals received from one or more sensing devices, maximum and minimum current (real-time) motor torque capacities of the traction motor; calculating, via the controller, maximum and minimum effective (fast) motor capacities of the traction motor based on a previous motor torque command and the maximum and minimum current motor torque capacities, respectively; determining, via the controller, a crankshaft torque reserve of the engine assembly; determining, via the controller, if a negative of the crankshaft torque reserve is: (1) greater than the minimum effective motor capacity, and (2) less than the maximum effective motor capacity; responsive to the negative of the crankshaft torque reserve being greater than the minimum effective motor capacity or less than the maximum effective motor capacity, setting an immediate engine spark torque command equal to a calibrated air torque spark value; and transmitting, to the engine assembly, a command signal to modulate engine torque output based on the immediate engine spark torque command.

Additional aspects of this disclosure are directed to electric-drive vehicles with dynamically allocated fast-torque production capabilities. As used herein, the terms "vehicle" and "motor vehicle" may include any relevant vehicle platform, such as passenger vehicles (ICE, HEV, FEV, fuel cell, fully and partially autonomous, etc.), commercial vehicles, industrial vehicles, tracked vehicles, off-road and all-terrain vehicles (ATV), motorcycles, farm equipment, watercraft, aircraft, etc. In an example, an electric-drive vehicle includes a vehicle body with multiple road wheels and other standard original equipment. Mounted on the vehicle body is one or more electric traction motors that selectively drive one or more of the road wheels to thereby propel the vehicle. Also mounted on the vehicle body is an engine assembly that operates, independently or cooperatively with the traction motor(s), to drive one or more of the vehicle's road wheels.

Continuing with the above example, the electric-drive vehicle also includes a vehicle controller or a network of distributed controllers that regulates operation of the traction motor(s) and engine assembly. The vehicle controller is programmed to determine maximum and minimum current (real-time) motor torque capacities of the traction motor(s) based, at least in part, on one or more sensor signals received from one or more sensing devices. The controller then calculates maximum and minimum effective (fast) motor capacities of the traction motor(s) based on a previous motor torque command and the maximum and minimum current motor torque capacities, respectively. Using these values, the controller determines if a negative of a calculated engine crankshaft torque reserve is greater than the minimum effective motor capacity and less than the maximum effective motor capacity. Responsive to the negative of the crankshaft torque reserve being greater than the minimum effective motor capacity or less than the maximum effective motor capacity, the controller sets an immediate engine spark torque command equal to a calibrated air torque spark value, and transmits one or more signals to the engine assembly to modulate engine torque output based on this immediate engine spark torque command.

The above summary is not intended to represent every embodiment or every aspect of the present disclosure. Rather, the foregoing summary merely provides an exemplification of some of the novel concepts and features set forth herein. The above features and advantages, and other features and attendant advantages of this disclosure, will be readily apparent from the following detailed description of illustrated examples and representative modes for carrying out the present disclosure when taken in connection with the accompanying drawings and the appended claims. Moreover, this disclosure expressly includes any and all combinations and subcombinations of the elements and features presented above and below.

The present disclosure is amenable to various modifications and alternative forms, and some representative embodiments are shown by way of example in the drawings and will be described in detail herein. It should be understood, however, that the novel aspects of this disclosure are not limited to the particular forms illustrated in the above-enumerated drawings. Rather, the disclosure is to cover all modifications, equivalents, combinations, subcombinations, permutations, groupings, and alternatives falling within the scope of this disclosure as encompassed by the appended claims.

DETAILED DESCRIPTION

This disclosure is susceptible of embodiment in many different forms. Representative embodiments of the disclosure are shown in the drawings and will herein be described in detail with the understanding that these embodiments are provided as an exemplification of the disclosed principles, not limitations of the broad aspects of the disclosure. To that extent, elements and limitations that are described, for example, in the Abstract, Introduction, Summary, and Detailed Description sections, but not explicitly set forth in the claims, should not be incorporated into the claims, singly or collectively, by implication, inference or otherwise.

For purposes of the present detailed description, unless specifically disclaimed: the singular includes the plural and vice versa; the words "and" and "or" shall be both conjunctive and disjunctive; the words "any" and "all" shall both mean "any and all"; and the words "including," "containing," "comprising," "having," and the like, shall each mean "including without limitation." Moreover, words of approximation, such as "about," "almost," "substantially," "generally," "approximately," and the like, may each be used herein in the sense of "at, near, or nearly at," or "within 0-5% of," or "within acceptable manufacturing tolerances," or any logical combination thereof, for example. Lastly, directional adjectives and adverbs, such as fore, aft, inboard, outboard, starboard, port, vertical, horizontal, upward, downward, front, back, left, right, etc., may be with respect to a motor vehicle, such as a forward driving direction of a motor vehicle when the vehicle is operatively oriented on a normal driving surface.

Figure 1:
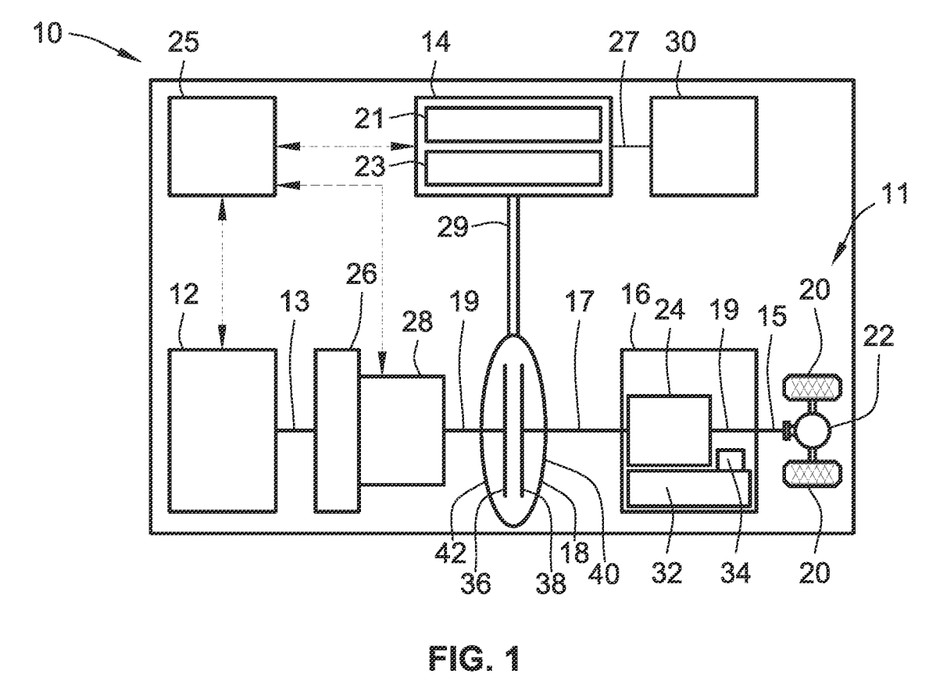
FIG. 1 is a schematic illustration of a representative electric-drive motor vehicle with a hybrid powertrain having an engine assembly and an electric motor/generator unit drivingly connected to a final drive system via a multi-speed power transmission in accordance with aspects of the present disclosure.

Referring now to the drawings, wherein like reference numbers refer to like features throughout the several views, there is shown in FIG. 1 a schematic illustration of a representative automobile, which is designated generally at 10 and portrayed herein for purposes of discussion as a passenger vehicle with a parallel two-clutch (P2) hybrid-electric powertrain. In particular, the illustrated powertrain is generally composed of a single engine 12 and a single motor 14 that operate, individually and in concert, to transmit tractive power to a multi-speed power transmission 16 through a hydrokinetic torque converter (TC) assembly 18 to drive one or more road wheels 20 of the vehicle's final drive system 11. The illustrated automobile 10—also referred to herein as "motor vehicle" or "vehicle" for short—is merely an exemplary application with which novel aspects and features of this disclosure can be practiced. In the same vein, implementation of the present concepts into a P2-hybrid powertrain should also be appreciated as an exemplary application of the novel concepts disclosed herein. As such, it will be understood that aspects and features of the present disclosure can be applied to other vehicle powertrain architectures and utilized for any logically relevant type of motor vehicle. Lastly, only select components have been shown and will be described in additional detail herein. Nevertheless, the vehicles, powertrains, and control systems discussed below may include numerous additional and alternative features, and other available peripheral components, for carrying out the various methods and functions of this disclosure.

The representative vehicle powertrain system is shown in FIG. 1 with a prime mover, such as a restartable internal combustion engine (ICE) assembly 12, that is drivingly connected to a driveshaft 15 of a final drive system 11 by a multi-speed automatic power transmission 16. The engine 12 transfers power, preferably by way of torque via an engine crankshaft 13 ("engine output member"), to an input side of the transmission 16. According to the illustrated example, the ICE assembly 12 rotates an engine-driven torsional damper assembly 26 and, through the torsional damper assembly 26, an engine disconnect device 28. This engine disconnect device 28, when operatively engaged, transmits torque received from the ICE assembly 12 by way of the damper 26 to input structure of the TC assembly 18. The transmission 16, in turn, is adapted to receive, selectively manipulate, and distribute tractive power from the engine 12 and motor 14 to the vehicle's final drive system 11—represented herein by a driveshaft 15, rear differential 22, and a pair of rear road wheels 20—and thereby propel the hybrid vehicle 10. The power transmission 16 and torque converter 18 of FIG. 1 may share a common transmission oil pan or "sump" 32 for supply of hydraulic fluid, as well as a shared transmission pump 34 for sufficient hydraulic pressure to activate the elements of the transmission 16, the TC assembly 18 and, for some implementations, the engine disconnect device 28.

The ICE assembly 12 operates to propel the vehicle 10 independently of the electric traction motor 14, e.g., in an "engine-only" operating mode, or in cooperation with the motor 14, e.g., in a "motor-boost" operating mode. In the example depicted in FIG. 1, the ICE assembly 12 may be any available or hereafter developed engine, such as a compression-ignited diesel engine or a spark-ignited gasoline or flex-fuel engine, which is readily adapted to provide its available power output typically at a number of revolutions per minute (RPM). Although not explicitly portrayed in FIG. 1, it should be appreciated that the final drive system 11 may take on any available configuration, including front wheel drive (FWD) layouts, rear wheel drive (RWD) layouts, four-wheel drive (4WD) layouts, all-wheel drive (AWD) layouts, etc. It is also envisioned that the disclosed concepts be applied to a Belt-Alternator-Starter (BAS) vehicle powertrain configuration.

FIG. 1 also depicts an electric motor/generator unit 14 or other suitable traction motor that operatively connects via a motor support hub, shaft or belt 29 ("motor output member") to torque converter 18, and via torque converter 18 to an input shaft 17 ("transmission input member") of the transmission 16. The motor/generator unit 14 may be directly coupled onto a TC input shaft or rigidly mounted to a housing portion of the torque converter 18. The electric motor/generator unit 14 is composed of an annular stator 21 circumscribing and concentric with a rotor 23. Electric power is provided to the stator 21 through electrical conductors or cables 27 that pass through the motor housing in suitable sealing and insulating feedthroughs (not illustrated). Conversely, electric power may be provided from the MGU 14 to an onboard traction battery pack 30, e.g., through regenerative braking. Operation of any of the illustrated powertrain components may be governed by an onboard or remote vehicle controller, such as programmable electronic control unit (ECU) 25. While shown as a P2 hybrid-electric architecture with a single motor in parallel power-flow communication with a single engine assembly, the vehicle 10 may employ other powertrain configurations, including P0, P1, and P2.5 hybrid powertrains, any of which may be adapted for an REV, PHEV, range-extended hybrid vehicle, fuel-cell hybrid vehicle, etc.

Power transmission 16 may use differential gearing 24 to achieve selectively variable torque and speed ratios between transmission input and output shafts 17 and 19, respectively, e.g., while sending all or a fraction of its power through the variable elements. One form of differential gearing is the epicyclic planetary gear arrangement. Planetary gearing offers the advantage of compactness and different torque and speed ratios among all members of the planetary gearing subset. Traditionally, hydraulically actuated torque establishing devices, such as clutches and brakes (the term "clutch" used to reference both clutches and brakes), are selectively engageable to activate the aforementioned gear elements for establishing desired forward and reverse speed ratios between the transmission's input and output shafts. While envisioned as an 8-speed automatic transmission, the power transmission 16 may optionally take on other suitable configurations, including Continuously Variable Transmission (CVT) architectures, automated-manual transmissions, etc.

As indicated above, ECU 25 is constructed and programmed to govern, among other things, operation of the engine 12, motor 14, transmission 16, TC 18, and disconnect device 28. Control module, module, controller, control unit, electronic control unit, processor, and any permutations thereof may be used interchangeably and synonymously to mean any one or various combinations of one or more of logic circuits, combinational logic circuit(s), Application Specific Integrated Circuit(s) (ASIC), electronic circuit(s), central processing unit(s) (e.g., microprocessor(s)), input/output circuit(s) and devices, appropriate signal conditioning and buffer circuitry, and other components to provide the described functionality, etc. Associated memory and storage (e.g., read only, programmable read only, random access, hard drive, tangible, etc.)), whether resident, remote or a combination of both, store processor-executable software and/or firmware programs or routines. Software, firmware, programs, instructions, routines, code, algorithms, and similar terms may be used interchangeably and synonymously to mean any processor-executable instruction sets, including calibrations and look-up tables. The ECU 25 may be designed with a set of control routines executed to provide the desired functions. Control routines are executed, such as by a central processing unit, and are operable to monitor inputs from sensing devices and other networked control modules, and execute control and diagnostic routines to control operation of devices and actuators. Routines may be executed in real-time, continuously, systematically, sporadically and/or at regular intervals, for example, each 100 microseconds, 3.125, 6.25, 12.5, 25 and 100 milliseconds, etc., during vehicle use or operation. Alternatively, routines may be executed in response to occurrence of an event during operation of the vehicle 10.

Hydrokinetic torque converter assembly 18 of FIG. 1 operates as a fluid coupling for operatively connecting the engine 12 and motor 14 with the internal epicyclic gearing 24 of the power transmission 16. Disposed within an internal fluid chamber of the torque converter assembly 18 is a bladed impeller 36 juxtaposed with a bladed turbine 38. The impeller 36 is situated in serial power-flow fluid communication with the turbine 38, with a stator (not shown) interposed between the impeller 36 and turbine 38 to selectively alter fluid flow therebetween. The transfer of torque from the engine and motor output members 13, 29 to the transmission 16 via the TC assembly 18 is through stirring excitation of hydraulic fluid, such as transmission oil, inside the TC's internal fluid chamber caused by rotation of the turbine and impeller blades. To protect these components, the torque converter assembly 18 is constructed with a TC pump housing, defined principally by a transmission-side pump shell 40 fixedly attached, e.g., via electron beam welding, MIG or MAG welding, laser welding, and the like, to an engine-side pump cover 42 such that a working hydraulic fluid chamber is formed therebetween.

To enable transient vehicle operation through intelligent powertrain control, the motor vehicle 10 of FIG. 1 is adapted to dynamically allocate fast torque actuator production between the E-machine 14 and internal combustion engine 12. As described above, powertrain torque output requests may be resolved into two general categories: base "slow" requests and rapid "fast" requests, depending upon the respective response times of the torque-generating devices satisfying these requests. Disclosed techniques opportunely charge/discharge the traction motor 14 during rapid-response torque decrease/increase requests. These fast torque requests are met by dynamically changing the combination and contribution of E-machine generated torque and modulated-spark-timing generated torque each controller execution loop (e.g., about every 10-15 ms). Through these techniques, the vehicle powertrain is able to reduce air torque reserves traditionally needed for producing desired fast torque requests. An "air torque reserve" may be typified as a standby volume of air available for immediate injection by the engine control module (ECM) or powertrain control module (PCM) to increase air intake pressure and concomitantly lean the air-to-fuel ratio at the cylinder to fulfill a requested crankshaft torque output.

Disclosed dynamic fact torque actuator allocation techniques may be employed to improve stall prevention response by exploiting available motor torque to assist with crankshaft torque output above the air torque response of the engine. As a further option, disclosed techniques may be employed to address fast torque requests for estimated torque spikes during fueled speed control to improve vehicle response time while minimizing fuel consumption with reduced emissions. In addition, these techniques help to improve fuel economy by generating rapid-response torque with the traction motor to seamlessly produce an immediate torque request decrease during a power-on upshift. A shift event that transitions the transmission from a lower gear to a higher gear (e.g., a shift from second gear to third gear) may be labelled as an "upshift" operation. To perform an upshift, the engine torque is sufficiently decreased to slow down the engine speed to one that corresponds with the transmission output speed multiplied by the transmission gear block ratio. Engine torque is then rapidly increased to a torque corresponding with the transmission output torque. Power upshift operations may be executed when the vehicle is travelling at all available speeds, e.g., with the throttle pedal depressed by the driver.

Figure 2:
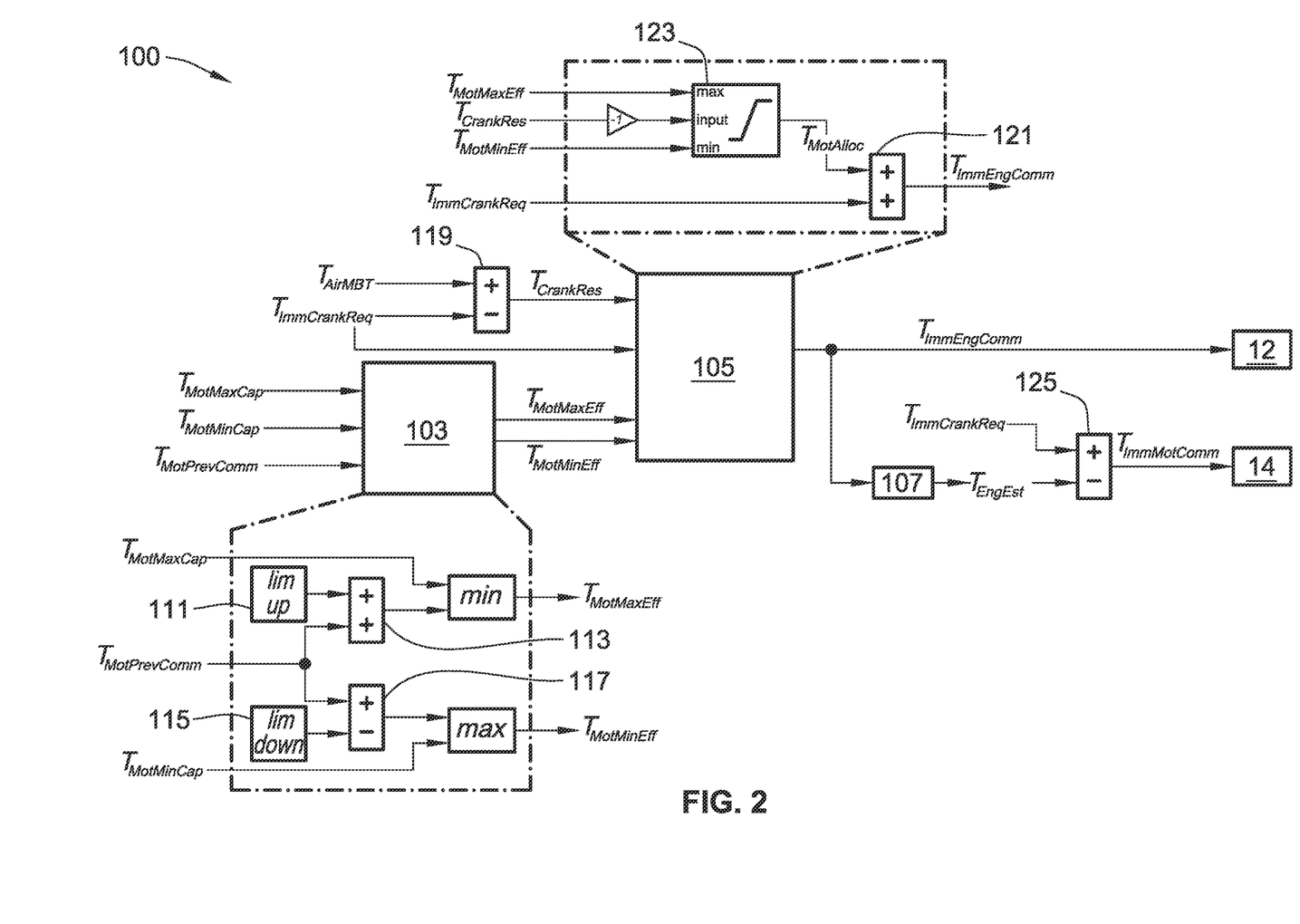
FIG. 2 is a diagrammatic illustration of a representative vehicle powertrain control system for provisioning dynamic allocation of fast-torque actuator production in accord with aspects of the disclosed concepts.

A representative vehicle powertrain control system for provisioning dynamic allocation of fast-torque actuator production is diagrammatically illustrated at 100 in FIG. 2. The powertrain control system 100 is generally composed of a Motor Torque Estimation (MTE) Module 103 that exchanges data with a Powertrain Control Module (PCM) 105 and an Engine Torque Estimation (ETM) module 107 for coordinating the torque output of a powertrain's prime mover(s), such as ICE assembly 12 and MGU 14 of FIG. 1. Each of the illustrated modules may be embodied as a discrete controller device that communicates, wired or wirelessly, with the other modules. Conversely, one or more or all of the modules may be embodied as individual software modules deployable within a larger control engine that is stored by in-vehicle memory and executed by a resident vehicle controller. The torque-based powertrain system control provided by the powertrain control system 100 may help to improve overall flexibility of engine control and operation, simplify software requirements for implementing such control, and provide for an automated calibration process. In this manner, overall implementation and development costs for a vehicle powertrain system can be reduced.

MTE Module 103 of FIG. 2 receives as inputs a maximum current (real-time) motor torque capacity $T_{MotMaxCap}$, a minimum current (real-time) motor torque capacity $T_{MotMinCap}$, and a previous motor torque command $T_{MotPrevComm}$. From these inputs, the MTE Module 103 outputs a maximum effective (fast) motor torque capacity $T_{MotMaxEff}$ and a minimum effective (fast) motor torque capacity $T_{MotMinEff}$. The maximum effective motor torque capacity $T_{MotMaxEff}$ is determined by taking the minimum of: (1) the maximum current motor torque capacity $T_{MotMaxCap}$; and (2) the mathematical sum of the previous motor torque command $T_{MotPrevComm}$ and a calibrated motor torque upper limit 111, with the final sum provided as an output signal from a summation selector 113. Along the same lines, the minimum effective motor torque capacity $T_{MotMinEff}$ is determined by taking the maximum of: (1) the minimum current motor torque capacity $T_{MotMinCap}$; and (2) the mathematical difference between the previous motor torque command $T_{MotPrevComm}$ and a calibrated/modeled motor torque lower limit 115, with the final difference provided as an output signal from a difference selector 117. The MTE Module 103 transmits these two outputs as control signals to the PCM 105 for subsequent aggregation and processing. Each of the input and output signals illustrated in FIG. 2 will be described in further detail during the discussion of method 200 of FIG. 3.

As the MTE Module 103 completes its calculations, the PCM 105 receives as inputs the maximum and minimum effective motor torque capacities $T_{MotMaxEff}$ and $T_{MotMinEff}$, as well as a crankshaft torque reserve $T_{CrankRes}$ and an immediate crankshaft torque request $T_{ImmCrankReq}$. According to the illustrated example, the crankshaft torque reserve $T_{CrankRes}$ is calculated as the mathematical difference between an air torque at a Maximum Brake Torque (MBT) $T_{AirMBT}$ and the immediate crankshaft torque request $T_{ImmCrankReq}$, with the final difference provided as an output signal from a difference selector 119. MBT may be typified as a spark timing that yields the maximum work—peak output torque and peak efficiency—for an engine assembly at a given air-to-fuel mixture for a given operating condition. During non-transient vehicle operation, an engine's spark angle is normally commanded as closely as possible to that angle which would provide a maximum level of brake torque production from the engine. Contrastingly, air torque at MBT may represent a best estimate of the maximum possible engine crankshaft torque that may occur instantaneously, given the present airflow rate and air/fuel ratio of an engine. It is possible to calculate the MBT of an engine by taking into account various operating conditions of the engine through its sensors, such as air/fuel ratio, engine load, internal exhaust gas recirculation, engine speed, spark advance, etc. Immediate crankshaft torque request may represent a transient torque value the system is being requested to achieve at the crankshaft with the powertrain's fast response actuators.

Using the input signals enumerated in the preceding paragraph, the PCM 105 calculates an immediate engine (spark) torque command $T_{ImmEngComm}$ that is output as a real-time torque command signal to the engine assembly 12 to meet an immediate crankshaft torque request generated, for example, by a driver. The immediate engine torque command $T_{ImmEngComm}$ may be calculated as the mathematical sum of the immediate crankshaft torque request $T_{ImmCrankReq}$ and a motor torque allocation $T_{MotAlloc}$, with the final sum provided as an output signal from a summation selector 121. Motor torque allocation $T_{MotAlloc}$ may be output from a torque limiter subroutine 123 in the form of a negative of the crankshaft torque reserve $T_{CrankRes}$ as limited on an upper end thereof by the maximum effective motor torque capacity $T_{MotMaxEff}$ and on a lower end thereof by the minimum effective motor torque capacity $T_{MotMinEff}$. Once calculated, the immediate engine torque command $T_{ImmEngComm}$ is transmitted as a command signal to the ICE assembly 12.

With continuing reference to FIG. 2, an ETM module 107 receives as an input signal the immediate engine torque command $T_{ImmEngComm}$ calculated by the PCM 105. In turn, the ETM module 107 processes the immediate engine torque command $T_{ImmEngComm}$ and outputs an estimated engine torque $T_{EngEst}$. By way of example only, an engine torque model may be represented as:

$$T_{EngEst} = f(APC, SA, iCPP, eCPP, AFR, OT, AC\#)$$

where estimated engine torque $T_{EngEst}$ is a function of air per cylinder (APC), spark advance (SA), intake cam phaser position (iCPP), exhaust cam phaser position (eCPP), air/fuel ratio (AFR), oil temperature (OT), and number of activated cylinders (AC#). Additional variables may also be accounted for in estimating engine torque, such as the degree of opening of an exhaust gas recirculation (EGR) valve. An immediate motor torque command $T_{ImmMotComm}$ is thereafter calculated as the mathematical difference between the immediate crankshaft torque request $T_{ImmCrankReq}$ and the estimated engine torque $T_{EngEst}$, with the final difference provided as an output signal from a difference selector 125. The immediate motor torque command $T_{ImmMotComm}$ is transmitted as a command signal to the traction motor 14.

Figure 3:
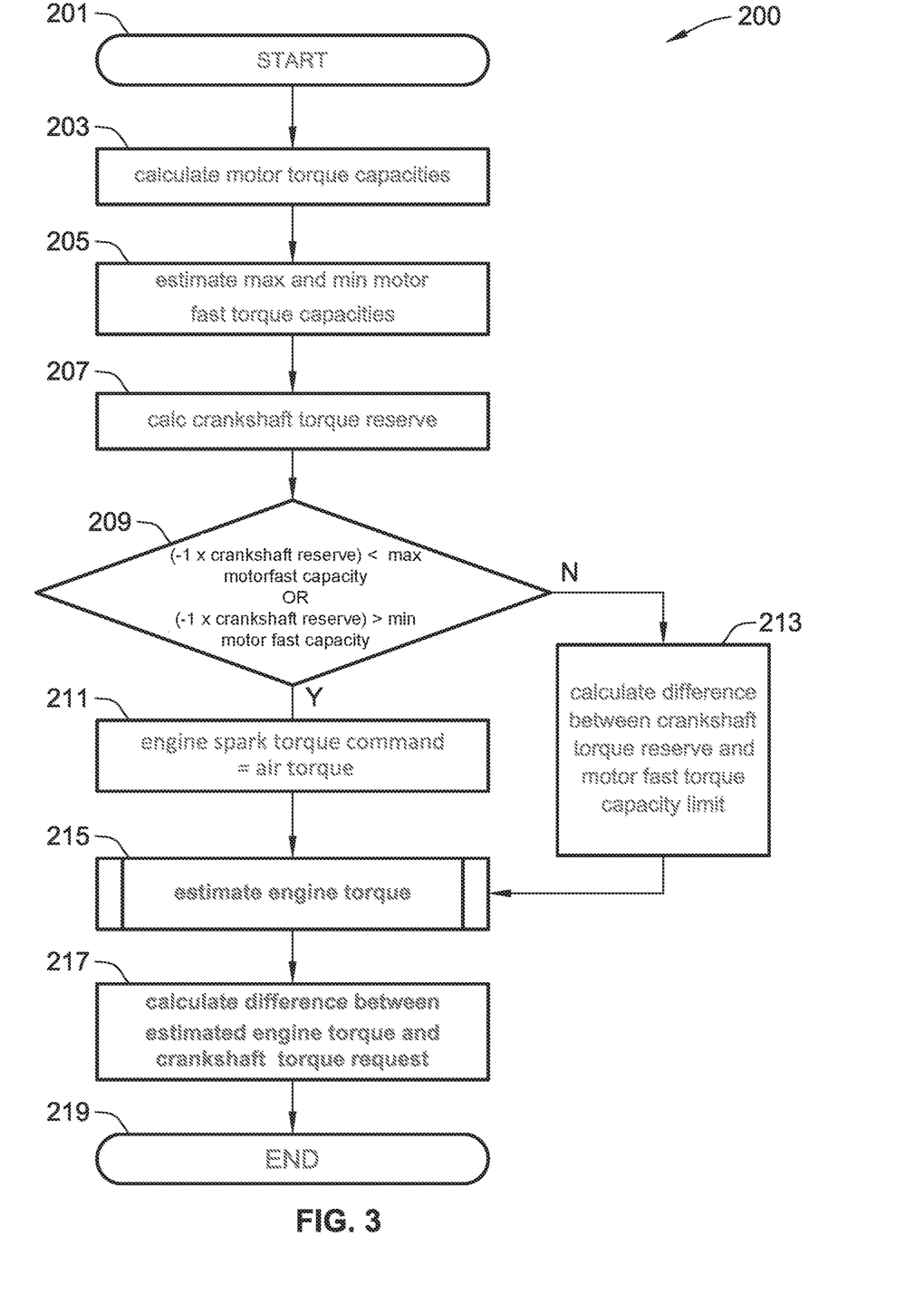
FIG. 3 is a flowchart illustrating a representative powertrain control algorithm for dynamically allocating fast-torque actuator production, which may correspond to memory-stored instructions executed by an onboard or remote controller, control-logic circuitry, programmable electronic control unit, or other integrated circuit (IC) device or a network of IC devices in accord with aspects of the disclosed concepts.

With reference now to the flow chart of FIG. 3, an improved method or control strategy for dynamically allocating fast-torque actuator production of a motor vehicle, such as electric-drive vehicle 10 of FIG. 1, using a suitable controller or control system, such as powertrain control system 100 of FIG. 2, is generally described at 200 in accordance with aspects of the present disclosure. Some or all of the operations illustrated in FIG. 3 and described in further detail below may be representative of an algorithm that corresponds to processor-executable instructions that may be stored, for example, in main or auxiliary or remote memory, and executed, for example, by an on-board or off-board controller, processing unit, control logic circuit, or other module or device, to perform any or all of the above or below described functions associated with the disclosed concepts. It should be recognized that the order of execution of the illustrated operation blocks may be changed, additional blocks may be added, and some of the blocks described may be modified, combined, or eliminated.

Method 200 begins at terminal block 201 of FIG. 3 with processor-executable instructions for a programmable controller or control module or similarly suitable processor to call up an initialization procedure for a fast torque request protocol. This routine may be executed in real-time, continuously, systematically, sporadically, and/or at regular intervals during active or autonomous vehicle operation. As yet another option, block 201 may initialize responsive to a user input prompt from an occupant of the vehicle, such as one or more electrical signals indicating a throttle pedal or a brake pedal is being depressed by the vehicle's driver. To carry out this protocol, a vehicle control system or any combination of one or more subsystems may be operable to receive, process, and synthesize pertinent information and inputs, and execute control logic and algorithms to regulate various powertrain system, fuel system, battery system, and/or brake system components to achieve desired control targets.

Upon initialization of the fast torque request protocol at block 201, method 200 proceeds to process block 203 with memory-stored, processor-executable instructions to calculate a maximum and a minimum motor torque capacity for the vehicle powertrain's traction motor(s), such as the maximum and minimum current motor torque capacities $T_{MotMaxCap}$ and $T_{MotMinCap}$ discussed above with respect to FIG. 2. The maximum current motor torque capacity—or "Motor Max Capacity"—may represent a maximum torque capacity that can be provided by a traction motor at a given time as limited by the vehicle battery system and power inverter module. By comparison, the minimum current motor torque capacity—or "Motor Min Capacity"—may represent a minimum torque capacity that is provided by the traction motor at a given time as governed by the vehicle battery system and power inverter module. Both Motor Max Capacity and Motor Min Capacity may be calculated from sensor data indicative of pertinent vehicle operating conditions, including motor speed, motor temperature, inverter temperature, battery power, battery voltage, battery current, etc. For instance, real-time motor torque capacity may be calculated as maximum and minimum torque capabilities at a current motor speed and temperature as derived by the vehicle's resident motor controller. Dynamometer calibration tests may be performed on a given motor/inverter pair to find a total electrical power loss at various speed-and-torque combinations, e.g., during both generating and motoring operating states. A linear regression analysis and curve fit is then performed to model the motor and inverter power loss at these motor speeds; the derived model is used to equate battery power to motor torque. Motor capacities are ascertained by taking the max and min of the motor torque capacities (e.g., from the motor controller) and motor torque at max/min battery power (e.g., from the battery controller).

Method 200 of FIG. 3 continues to process block 205 to estimate a maximum and a minimum motor fast capacity, such as the maximum and minimum effective motor torque capacities $T_{MotMaxEff}$ and $T_{MotMinEff}$ of FIG. 2. As explained above, these two parameters may be derived from a prior-in-time motor torque command (e.g., previous motor torque command $T_{MotPrevComm}$) and the current motor capacities calculated at block 203 (e.g., current motor torque capacities $T_{MotMaxCap}$ and $T_{MotMinCap}$). The maximum motor fast torque capacity—or "Motor Max Effective Capacity"—may represent a maximum motor torque that can be produced via a traction motor with a similar response time to that of an engine torque resulting from spark retardation or fuel shut off. Along the same lines, minimum motor fast torque capacity—or "Motor Min Effective Capacity"—may represent a minimum motor torque that can be produced via a traction motor with a similar response time to that of an engine torque resulting from spark retardation or fuel shut off. To estimate a motor's fast torque capacity, the PCM retrieves the previous motor command and limits the maximum and minimum motor capacities through calibration-based empirical testing. One factor that may be taken into account when determining motor fast torque capacities is identifying on which side of the belt/isolator "lash" the previous motor command resides. When crossing through the lash zone with zero torque, e.g., on a belt/isolator system or in a gear train, torque is slowly controlled to avoid drive quality excitations (e.g., bumps and jerks) that are perceptible by the vehicle occupants. For this reason, motor fast torque capacity may be limited to torques produced on a side of the lash zone (positive or negative torque). Previous motor torque command may be a preceding command signal from a hybrid optimization module to the motor and inverter control system. It is also plausible to predict a previous motor torque command through testing and calibration or an online model of the physical system.

Prior to, contemporaneous with, or after completing blocks 201, 203 and 205, method 200 advances to process block 207 to calculate for the powertrain's engine assembly a crankshaft torque reserve, such as crankshaft torque reserve $T_{CrankRes}$ of FIG. 2. Crankshaft torque reserve may be calculated as the difference between the engine's air torque at MBT (e.g., MBT air torque $T_{AirMBT}$) and an immediate crankshaft torque request (e.g., torque request $T_{ImmCrankReq}$). For at least some implementations, this value will be zero if no immediate crankshaft torque is being requested. The crankshaft torque reserve is conventionally requested by engine controls for cases where output torque may need to be increased quickly due to changing vehicle operating conditions (e.g., air conditioning clutch being engaged, larger accessory electrical loads, etc.). This torque reserve achieves the quick torque increase by advancing spark with a corresponding increased level of combustion in the engine cylinders. In the illustrated example, the powertrain system may employ the traction motor to produce this torque reserve rather than using advancing spark.

With continuing reference to FIG. 3, the method 200 ascertains at decision block 209 whether or not a negative of the calculated crankshaft torque reserve is: (1) greater than the estimated minimum effective motor capacity, and (2) less than the estimated maximum effective motor capacity. The negative of the crankshaft reserve is evaluated because, in order for the motor to meet the crankshaft reserve and, thus, allow spark torque to return to MBT, the motor should produce an opposite torque on the crankshaft to meet an immediate crankshaft request. For instance, during a decreasing immediate crankshaft request (e.g., during fueled speed control or upshifts), the motor may be expected to charge (e.g., negative torque [min capacity]) the amount of crankshaft reserve to meet the crank request. Conversely, for an increasing immediate crankshaft request (e.g., stall prevention), the motor may be expected to discharge (positive torque [max capacity]) the amount of crankshaft reserve to meet the crank request. Upon determining that the negative of the crankshaft torque reserve is either greater than the minimum effective motor capacity or less than the maximum effective motor capacity (block 209=YES), method 200 moves to process block 211 and sets an engine spark torque command equal to an air torque value. In particular, the powertrain control system has determined that the crankshaft torque reserve may be produced in its entirety by the powertrains E-machine(s) (i.e., the motor's fast/effective torque capacity is greater than the engine's torque reserve). As such, the control system sets the engine spark torque command to be equal to the air torque command at MBT as this is likely the most efficient operating point at the current engine speed and torque. Using this set point, the control system transmits an immediate engine torque command, such as immediate engine (spark) torque command $T_{ImmEngComm}$, to downstream engine controls to command the engine assembly to produce this torque level at the crankshaft.

Responsive to a determination that the negative of the crankshaft torque reserve is concurrently not greater than the minimum effective motor capacity and not less than the maximum effective motor capacity (block 209=NO), method 200 moves to process block 213 and calculates a difference between the crankshaft torque reserve and the upper and lower limits of the motor's fast torque capacity. In this instance, the powertrain control system has determined that the crankshaft torque reserve likely cannot be produced in its entirety by the powertrains E-machine(s). Using this set point, the control system transmits an immediate engine torque command, such as immediate engine (spark) torque command $T_{ImmEngComm}$ to downstream engine controls to command the engine assembly to produce this torque level at the crankshaft by retarding or advancing spark angle.

At predefined process block 215 of FIG. 3, method 200 draws on an engine torque model to predict a current (real-time) engine torque, such as estimated engine torque $T_{EngEst}$ described above in the discussion of FIG. 2. This estimated engine torque may represent a predicted engine torque being produced at the crankshaft based upon current engine airflow, fuel intake, spark command, etc. Engine torque may be estimated by a math-based or lab-based engine model that correlates current airflow per cylinder and spark/phaser angle with engine torque. Method 200 then proceeds to process block 217 to calculate a difference between this engine torque estimate and the crankshaft torque request. A motor torque command is thereafter transmitted to the vehicle battery system controller and power inverter module to thereby automate motor torque output to a desired value. At this juncture, the method 200 of FIG. 3 may advance from process block 217 to terminal block 219 and terminate, or may loop back to terminal block 201 and run in a continuous loop.

Aspects of this disclosure may be implemented, in some embodiments, through a computer-executable program of instructions, such as program modules, generally referred to as software applications or application programs executed by any of a controller or the controller variations described herein. Software may include, in non-limiting examples, routines, programs, objects, components, and data structures that perform particular tasks or implement particular data types. The software may form an interface to allow a computer to react according to a source of input. The software may also cooperate with other code segments to initiate a variety of tasks in response to data received in conjunction with the source of the received data. The software may be stored on any of a variety of memory media, such as CD-ROM, magnetic disk, bubble memory, and semiconductor memory (e.g., various types of RAM or ROM).

Moreover, aspects of the present disclosure may be practiced with a variety of computer-system and computer-network configurations, including multiprocessor systems, microprocessor-based or programmable-consumer electronics, minicomputers, mainframe computers, and the like. In addition, aspects of the present disclosure may be practiced in distributed-computing environments where tasks are performed by resident and remote-processing devices that are linked through a communications network. In a distributed-computing environment, program modules may be located in both local and remote computer-storage media including memory storage devices. Aspects of the present disclosure may therefore be implemented in connection with various hardware, software or a combination thereof, in a computer system or other processing system.

Any of the methods described herein may include machine readable instructions for execution by: (a) a processor, (b) a controller, and/or (c) any other suitable processing device. Any algorithm, software, control logic, protocol or method disclosed herein may be embodied as software stored on a tangible medium such as, for example, a flash memory, a CD-ROM, a floppy disk, a hard drive, a digital versatile disk (DVD), or other memory devices. The entire algorithm, control logic, protocol, or method, and/or parts thereof, may alternatively be executed by a device other than a controller and/or embodied in firmware or dedicated hardware in an available manner (e.g., implemented by an application specific integrated circuit (ASIC), a programmable logic device (PLD), a field programmable logic device (FPLD), discrete logic, etc.). Further, although specific algorithms are described with reference to flowcharts depicted herein, many other methods for implementing the example machine-readable instructions may alternatively be used.

Aspects of the present disclosure have been described in detail with reference to the illustrated embodiments; those skilled in the art will recognize, however, that many modifications may be made thereto without departing from the scope of the present disclosure. The present disclosure is not limited to the precise construction and compositions disclosed herein; any and all modifications, changes, and variations apparent from the foregoing descriptions are within the scope of the disclosure as defined by the appended claims. Moreover, the present concepts expressly include any and all combinations and subcombinations of the preceding elements and features.

What is claimed:

1. A method of controlling torque output of a vehicle powertrain of a motor vehicle, the motor vehicle including multiple road wheels, an engine assembly and a traction motor both configured to drive one or more of the road wheels, and a vehicle controller programmed to regulate operation of the traction motor and the engine assembly, the method comprising:

determining, via the vehicle controller based on a sensor signal received from a sensing device, maximum and minimum current motor torque capacities of the traction motor;

calculating, via the vehicle controller, maximum and minimum effective motor capacities of the traction motor based on a previous motor torque command and the maximum and minimum current motor torque capacities, respectively;

determining, via the vehicle controller, a crankshaft torque reserve of the engine assembly;

determining, via the vehicle controller, if a negative of the crankshaft torque reserve is greater than the minimum effective motor capacity and if the negative of the crankshaft torque reserve is less than the maximum effective motor capacity;

setting, in response to the negative of the crankshaft torque reserve being greater than the minimum effective motor capacity or less than the maximum effective motor capacity, an immediate engine spark torque command equal to a calibrated air torque spark value; and transmitting, via the vehicle controller to the engine assembly, a command signal to modulate engine output based on the immediate engine spark torque command.

2. The method of claim 1, wherein the sensor signal received for determining the maximum and minimum current motor torque capacities is indicative of a current vehicle operating condition, the current vehicle operating condition including a motor speed, a motor temperature, an inverter temperature, a battery power, a battery voltage output, and/or a battery current output.

3. The method of claim 1, wherein the maximum current motor torque capacity is indicative of a maximum torque capacity of the traction motor as constrained by an electronic power inverter and a battery system electrically connected to and powering the traction motor.

4. The method of claim 1, wherein the minimum current motor torque capacity is indicative of a minimum torque capacity of the traction motor as constrained by an electronic power inverter and a battery system electrically connected to and powering the traction motor.

5. The method of claim 1, wherein determining the crankshaft torque reserve includes calculating a difference between an air torque at a Maximum Brake Torque (MBT) of the engine assembly and an immediate crankshaft torque request for the vehicle powertrain.

6. The method of claim 5, wherein the air torque at the MBT of the engine assembly includes an estimate of maximum instantaneous crankshaft torque of the engine assembly at a present airflow rate and a present air/fuel ratio.

7. The method of claim 6, wherein the immediate crankshaft torque request includes a transient value based on an input signal received from a throttle pedal of the motor vehicle.

8. The method of claim 1, wherein the maximum effective motor capacity is indicative of a maximum motor torque the traction motor is capable of producing with a similar response time to an engine torque output of the engine assembly resulting from an engine spark retardation or a fuel shut off.

9. The method of claim 8, wherein the minimum effective motor capacity is indicative of a minimum motor torque the traction motor is capable of producing with the similar response time to the engine torque output resulting from the engine spark retardation or the fuel shut off.

10. The method of claim 1, further comprising:
determining, in response to the negative of the crankshaft torque reserve not being greater than the minimum effective motor capacity and not being less than the maximum effective motor capacity, a difference between the crankshaft torque reserve and a motor fast torque capacity limit of the traction motor;
setting a second immediate engine spark torque command equal to a modulated torque spark value determined from the difference between the crankshaft torque reserve and the motor fast torque capacity limit; and
transmitting, via the vehicle controller to the engine assembly, a second command signal to modulate engine output based on the second immediate engine spark torque command.

11. The method of claim 1, further comprising:
determining an estimated engine torque for the engine assembly based on the immediate engine spark torque command, a current airflow rate, and a current air/fuel ratio;
calculating a difference between the estimated engine torque and an engine crankshaft torque request; and
transmitting, via the vehicle controller to the traction motor, a motor torque command based on the difference between the estimated engine torque and the engine crankshaft torque request.

12. The method of claim 1, wherein the previous motor torque command includes a motor torque command signal transmitted via the controller to the traction motor and an inverter control system prior to calculating the maximum and minimum effective motor capacities.

13. An electric-drive motor vehicle comprising:
a vehicle body with a plurality of road wheels mounted to the vehicle body;
a traction motor attached to the vehicle body and configured to drive one or more of the road wheels to thereby propel the motor vehicle;
an engine assembly attached to the vehicle body and configured to drive one or more of the road wheels to thereby propel the motor vehicle; and
a vehicle controller configured to regulate operation of the traction motor and the engine assembly, the vehicle controller being programmed to:
determine, based on a sensor signal received from a sensing device, maximum and minimum current motor torque capacities of the traction motor;
calculate maximum and minimum effective motor capacities of the traction motor based on a previous motor torque command and the maximum and minimum current motor torque capacities, respectively;
determine a crankshaft torque reserve of the engine assembly;
determine if a negative of the crankshaft torque reserve is greater than the minimum effective motor capacity and if the crankshaft torque reserve is less than the maximum effective motor capacity;
responsive to the negative of the crankshaft torque reserve being greater than the minimum effective motor capacity or less than the maximum effective motor capacity, set an immediate engine spark torque command equal to a calibrated air torque spark value; and
transmit a command signal to the engine assembly to modulate engine output based on the immediate engine spark torque command.

14. The electric-drive motor vehicle of claim 13, wherein the maximum current motor torque capacity is indicative of a maximum torque capacity of the traction motor as constrained by an electronic power inverter and a battery system electrically connected to and powering the traction motor, and wherein the minimum current motor torque capacity is indicative of a minimum torque capacity of the traction motor as constrained by an electronic power inverter and a battery system electrically connected to and powering the traction motor.

15. The electric-drive motor vehicle of claim 13, wherein determining the crankshaft torque reserve includes calculating a difference between an air torque at a Maximum Brake Torque (MBT) of the engine assembly and an immediate crankshaft torque request for the engine assembly.

16. The electric-drive motor vehicle of claim 13, wherein the maximum effective motor capacity is indicative of a maximum motor torque the traction motor is capable of producing with a similar response time to an engine torque output of the engine assembly resulting from an engine spark retardation or a fuel shut off, and wherein the minimum effective motor capacity is indicative of a minimum motor torque the traction motor is capable of producing with the similar response time to the engine torque output resulting from the engine spark retardation or the fuel shut off.

17. The electric-drive motor vehicle of claim 13, wherein the vehicle controller is further programmed to:
responsive to the negative of the crankshaft torque reserve not being greater than the minimum effective motor capacity and not being less than the maximum effective motor capacity, determine a difference between the crankshaft torque reserve and a motor fast torque capacity limit of the traction motor;

set a second immediate engine spark torque command equal to a modulated torque spark value determined from the difference between the crankshaft torque reserve and the motor fast torque capacity limit; and transmit a second command signal to the engine assembly to modulate engine output based on the second immediate engine spark torque command.

18. The electric-drive motor vehicle of claim 13, wherein the vehicle controller is further programmed to:

determine an estimated engine torque for the engine assembly based on the immediate engine spark torque command, a current airflow rate, and a current air/fuel ratio;

calculate a difference between the estimated engine torque and an engine crankshaft torque request; and transmit a motor torque command to the traction motor based on the difference between the estimated engine torque and the engine crankshaft torque request.

19. The electric-drive motor vehicle of claim 13, wherein the previous motor torque command includes a motor torque command signal transmitted via the controller to the traction motor and an inverter control system prior to calculating the maximum and minimum effective motor capacities.

20. The electric-drive motor vehicle of claim 13, wherein the sensor signal received for determining the maximum and minimum current motor torque capacities is indicative of a current vehicle operating condition, the current vehicle operating condition including a motor speed, a motor temperature, an inverter temperature, a battery power, a battery voltage output, and/or a battery current output.

* * * * *